United States Patent
Matsudaira et al.

(10) Patent No.: US 11,717,968 B2
(45) Date of Patent: Aug. 8, 2023

(54) ROBOT CONTROL DEVICE, ROBOT CONTROL METHOD, AND COLLABORATIVE OPERATION UNIT

(71) Applicant: FANUC CORPORATION, Yamanashi (JP)

(72) Inventors: Tetsuro Matsudaira, Yamanashi-ken (JP); Minoru Enomoto, Yamanashi-ken (JP); Shuntaro Toda, Yamanashi-ken (JP)

(73) Assignee: Fanuc Corporation, Yamanashi (JP)

( * ) Notice: Subject to any disclaimer, the term of this patent is extended or adjusted under 35 U.S.C. 154(b) by 207 days.

(21) Appl. No.: 17/099,472

(22) Filed: Nov. 16, 2020

(65) Prior Publication Data

US 2021/0146544 A1 May 20, 2021

(30) Foreign Application Priority Data

Nov. 19, 2019 (JP) ................................. 2019-208772

(51) Int. Cl.
*B25J 9/16* (2006.01)
*B25J 13/08* (2006.01)

(52) U.S. Cl.
CPC ............. *B25J 9/1674* (2013.01); *B25J 9/162* (2013.01); *B25J 13/085* (2013.01)

(58) Field of Classification Search
CPC ........ B25J 9/1674; B25J 9/162; B25J 13/085; B25J 19/06; B25J 5/007; B25J 9/1664
See application file for complete search history.

(56) References Cited

U.S. PATENT DOCUMENTS

| 10,324,425 | B2* | 6/2019 | Takahashi | G05B 9/02 |
| 2016/0031086 | A1 | 2/2016 | Tanabe et al. | |
| 2016/0176052 | A1* | 6/2016 | Yamamoto | B25J 9/1676 901/49 |
| 2016/0257003 | A1* | 9/2016 | Oyama | B25J 9/1674 |
| 2018/0000683 | A1* | 1/2018 | Yamada | B25J 5/007 |
| 2019/0091870 | A1* | 3/2019 | Hino | B25J 9/1666 |
| 2019/0261566 | A1* | 8/2019 | Robertson | A01D 46/243 |
| 2019/0367112 | A1* | 12/2019 | Kim | B62D 57/024 |
| 2020/0110189 | A1* | 4/2020 | Fyffe | B63G 8/001 |
| 2021/0146544 | A1* | 5/2021 | Matsudaira | B25J 13/085 |
| 2021/0362336 | A1* | 11/2021 | Muneto | B25J 9/043 |

FOREIGN PATENT DOCUMENTS

| JP | H06-033210 U | 4/1994 |
| JP | 2016-32858 A | 3/2016 |
| KR | 20100138479 A | * 12/2010 |

* cited by examiner

*Primary Examiner* — Adam R Mott
*Assistant Examiner* — Sagar Kc
(74) *Attorney, Agent, or Firm* — Robert P. Michal, Esq.; Carter, DeLuca & Farrell LLP (57) ABSTRACT

A robot control device, which causes a robot mounted on a transport vehicle to be stopped on the basis of an external force applied to the robot, is equipped with a determination unit configured to determine whether or not the transport vehicle is currently traveling, and a control unit configured to cause the robot to be stopped in the case that the transport vehicle is currently traveling, and to enable the robot to be operated in the case that the transport vehicle is not currently traveling.

6 Claims, 9 Drawing Sheets

ROBOT CONTROL DEVICE, ROBOT CONTROL METHOD, AND COLLABORATIVE OPERATION UNIT

CROSS-REFERENCE TO RELATED APPLICATION

This application is based upon and claims the benefit of priority from Japanese Patent Application No. 2019-208772 filed on Nov. 19, 2019, the contents of which are incorporated herein by reference.

BACKGROUND OF THE INVENTION

Field of the Invention

The present invention relates to a control device and a control method for a robot that is mounted on a transport vehicle, as well as a collaborative operation unit equipped with the transport vehicle and the robot that is mounted on the transport vehicle.

Description of the Related Art

A collaborative operation unit is known, which is equipped with a robot operated in collaboration with a person, and a transport vehicle on which the robot is mounted. Such a robot, for example, is the "robot 100" disclosed in Japanese Laid-Open Patent Publication No. 2016-032858. With such a "robot 100," a determination is made as to whether or not the robot has come into contact with the person, based on whether or not an unexpected external force has been applied to the robot.

SUMMARY OF THE INVENTION

There are cases in which each of the robot and the transport vehicle is controlled so as to stop when the robot comes into contact with an obstacle. In such cases, even in the event that the external force is generated by the transport vehicle passing through a difference in level, the robot control device may recognize the external force as an external force generated due to contact with the obstacle. As a result, the transport vehicle is controlled so as to stop when the transport vehicle attempts to pass through the difference in level, and as a result, the transport vehicle is incapable of passing through such a difference in level.

Thus, the present invention relates to a collaborative operation unit equipped with a transport vehicle and a robot that is mounted on the transport vehicle, and has the object of providing a robot control device, a robot control method, and a collaborative operation unit, in which stopping of the transport vehicle is inhibited when the transport vehicle passes through a difference in level.

One aspect of the present invention is a robot control device configured to cause a robot mounted on a transport vehicle to be stopped on a basis of an external force applied to the robot, the robot control device comprising a determination unit configured to determine whether or not the transport vehicle is currently traveling, and a control unit configured to cause the robot to be stopped in a case that the transport vehicle is currently traveling, and to enable the robot to be operated in a case that the transport vehicle is not currently traveling.

Another aspect of the present invention is a collaborative operation unit comprising the robot control device according to the above aspect, a robot controlled by the control device, and a transport vehicle on which the control device and the robot are mounted.

Another aspect of the present invention is a robot control method for controlling a robot mounted on a transport vehicle, the robot control method comprising a determination step of determining whether or not the transport vehicle is currently traveling, a robot operation allowing step of, in a case that the transport vehicle is not currently traveling, detecting whether or not there is an abnormality based on an external force applied to the robot, while enabling the robot to be operated, and a robot stopping step of causing the robot to be stopped in a case that the transport vehicle is currently traveling, or in a case that the abnormality is detected.

According to the present invention, the robot control device, the robot control method, and the collaborative operation unit are provided, in which stopping of the transport vehicle is inhibited when the transport vehicle passes through a difference in level.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a robot control device, a robot control method, and a collaborative operation unit according to the present invention will be presented and described in detail below with reference to the accompanying drawings.

First Embodiment

Figure 1:
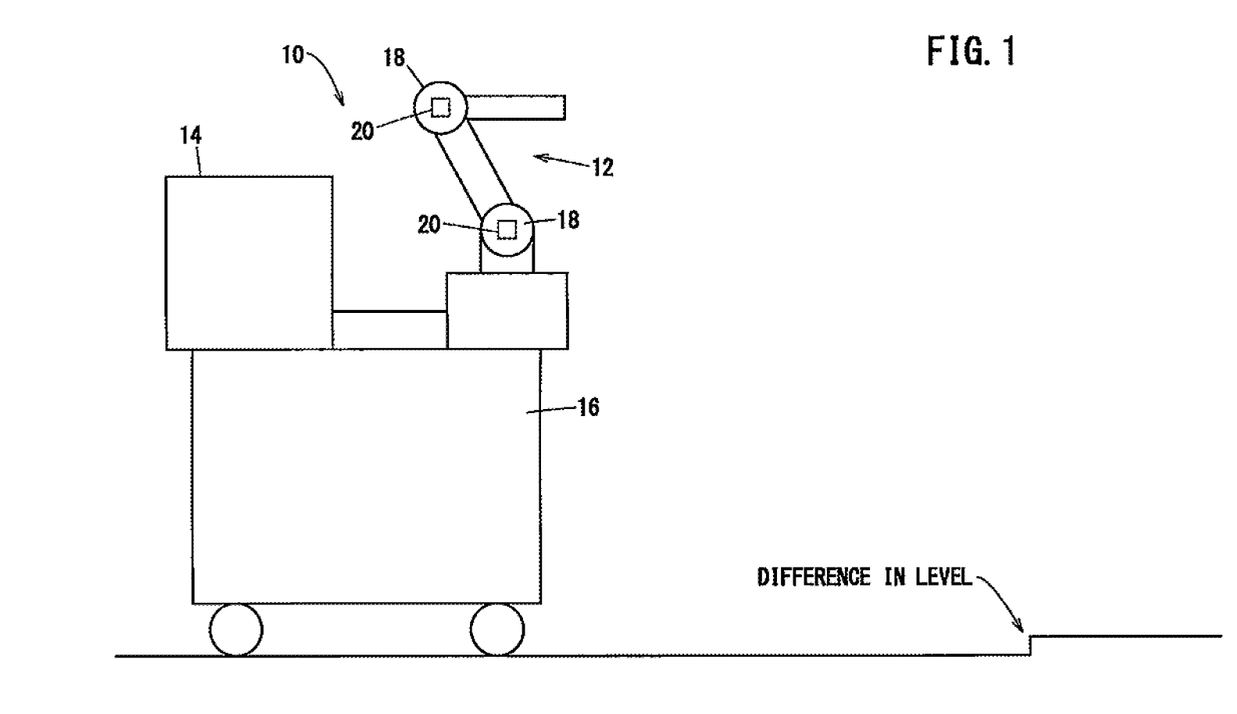
FIG. 1 is an overall configuration diagram of a collaborative operation unit according to a first embodiment.

FIG. 1 is an overall configuration diagram of a collaborative operation unit 10 according to a first embodiment.

The collaborative operation unit 10 performs operations in collaboration with a person while moving, for example, in a factory in which industrial products are manufactured. The collaborative operation unit 10 is equipped with a robot 12, a control device 14 for the robot 12, and a transport vehicle 16 on which the robot 12 and the control device 14 are mounted. Hereinafter, the phrase "control device 14 for the robot 12" will be referred to simply as a "control device 14".

The robot 12 according to the present embodiment is a robot arm having a plurality of joints. Further, the transport vehicle 16 according to the present embodiment implements movement of the collaborative operation unit 10 by traveling, and may also be generally referred to as an "automated guided vehicle" or an "AGV". Since the robot 12 and the transport vehicle 16 of this type are known, descriptions thereof may be appropriately omitted below.

The plurality of joints of the robot 12 are operated by driving of motors 18. The motors 18, for example, are servomotors. The motors 18 are driven by drive currents supplied from the control device 14 via a non-illustrated power supply circuit and amplifiers. Further, sensors 20 for detecting an external force F applied to the robot 12 are provided in the robot 12.

The sensors 20 are provided in the motors 18 of the joints, and detect the external force F on the basis of the drive currents supplied to the motors 18 from the control device 14, and the rotational torque of the rotary axes of the motors 18. Further, the sensors 20 output signals corresponding to the detected external force F to a monitoring unit 32 (to be described later) of the control device 14.

Figure 2:
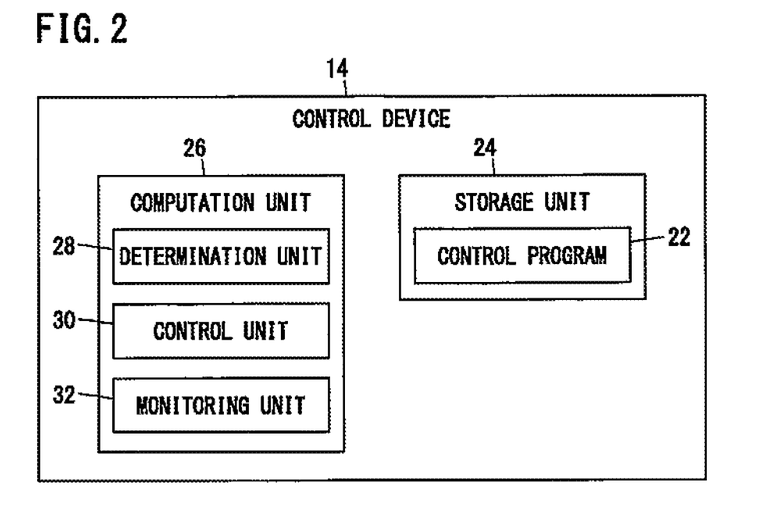
FIG. 2 is a functional configuration diagram of a robot control device according to the first embodiment.

FIG. 2 is a functional configuration diagram of the control device 14 for the robot 12 according to the first embodiment.

The control device 14 serves to control the robot 12 based on a predetermined control program 22. The control device 14 is equipped with a storage unit 24 and a computation unit 26.

The storage unit 24 includes in the configuration thereof, for example, a ROM (Read Only Memory) and a RAM (Random Access Memory) as hardware. The above-described predetermined control program 22 is stored in the storage unit 24.

The computation unit 26 includes in the configuration thereof, for example, a CPU (Central Processing Unit) as hardware. The computation unit 26 implements a control of the robot 12 by executing the predetermined control program 22 that is stored in the storage unit 24. In connection therewith, the computation unit 26 is equipped with a determination unit 28, a control unit 30, and the monitoring unit 32. Each of these units is realized by the computation unit 26 executing the control program 22 in cooperation with the storage unit 24. Hereinafter, descriptions will be given sequentially of these respective units.

The determination unit 28 determines whether or not the transport vehicle 16 is currently traveling. The specific method for making such a determination is not particularly limited. To give a few examples, for example, the determination unit 28 can make a determination by receiving a signal indicative of whether or not the transport vehicle 16 is currently traveling from the transport vehicle 16. Alternatively, the determination unit 28 can make a determination by receiving a signal indicative of the travel speed of the transport vehicle 16 from a speed sensor provided on the transport vehicle 16. Alternatively, the determination unit 28 can sequentially acquire the current position of the collaborative operation unit 10 by applying a GPS (Global Positioning System) to the collaborative operation unit 10, and make a determination based on a change in the acquired position.

Based on the result of the determination of the determination unit 28, the control unit 30 causes the robot 12 to be stopped in the case that the transport vehicle 16 is currently traveling, and enables the robot 12 to be operated in the case that the transport vehicle 16 is not currently traveling. In this instance, it is preferable for the control unit 30 to cut off the power supply to the robot 12 in the case that the transport vehicle 16 is currently traveling. Consequently, the robot 12 can be stopped more reliably. When the robot 12 is enabled to be operated, the power supply may be returned to a state in which it is capable of being restarted.

Cutting off of the power supply to the robot 12 implies that the supply of the drive current to the motors 18 is interrupted. Such a situation can be easily achieved by inserting a switching element into the electric wiring by which the drive current is supplied to the motors 18, and switching the switching element OFF.

Further, although a description thereof will be given later, the control unit 30 may receive a notification from the monitoring unit 32 to the effect that an abnormality has occurred in the robot 12. Upon receiving such a notification from the monitoring unit 32, the control unit 30 promptly causes the robot 12 to be stopped (fixes the posture of the robot 12).

Signals indicative of the external force F are input from the sensors 20 to the monitoring unit 32. Based on such signals, the monitoring unit 32 monitors whether or not an abnormal external force F is being applied to the robot 12 during operation thereof. Whether or not the external force F is abnormal is determined based on whether or not the external force F is in excess of a predetermined threshold Vth. The threshold Vth is determined by assuming a magnitude of the external force F that is applied to the robot which is normally operating on the basis of the control program. Further, when determining that an abnormal external force F is being applied to the robot 12 during operation thereof, the monitoring unit 32 determines that an abnormality has occurred during operation of the robot 12, and issues a notification to that effect to the control unit 30.

For example, it is assumed that the robot 12 during operation thereof comes into contact with (collides against) an obstacle. At this time, the sensors 20 detect the abnormal external force F in excess of the threshold from the robot 12. When a signal indicative of the external force F in excess of the predetermined threshold Vth is input thereto from the sensors 20, the monitoring unit 32 determines that an abnormality has occurred during operation of the robot 12, and issues a notification to that effect to the control unit 30. Consequently, the control device 14 according to the present embodiment is capable of promptly causing the robot 12 to be stopped, in the case that an abnormality such as contact between the robot 12 and an obstacle occurs.

Moreover, if the transport vehicle 16 is currently traveling, the robot 12 according to the present embodiment is not operated. Therefore, if the transport vehicle 16 is currently traveling, the monitoring unit 32 is not required to determine whether or not an abnormality has occurred.

Figure 3:
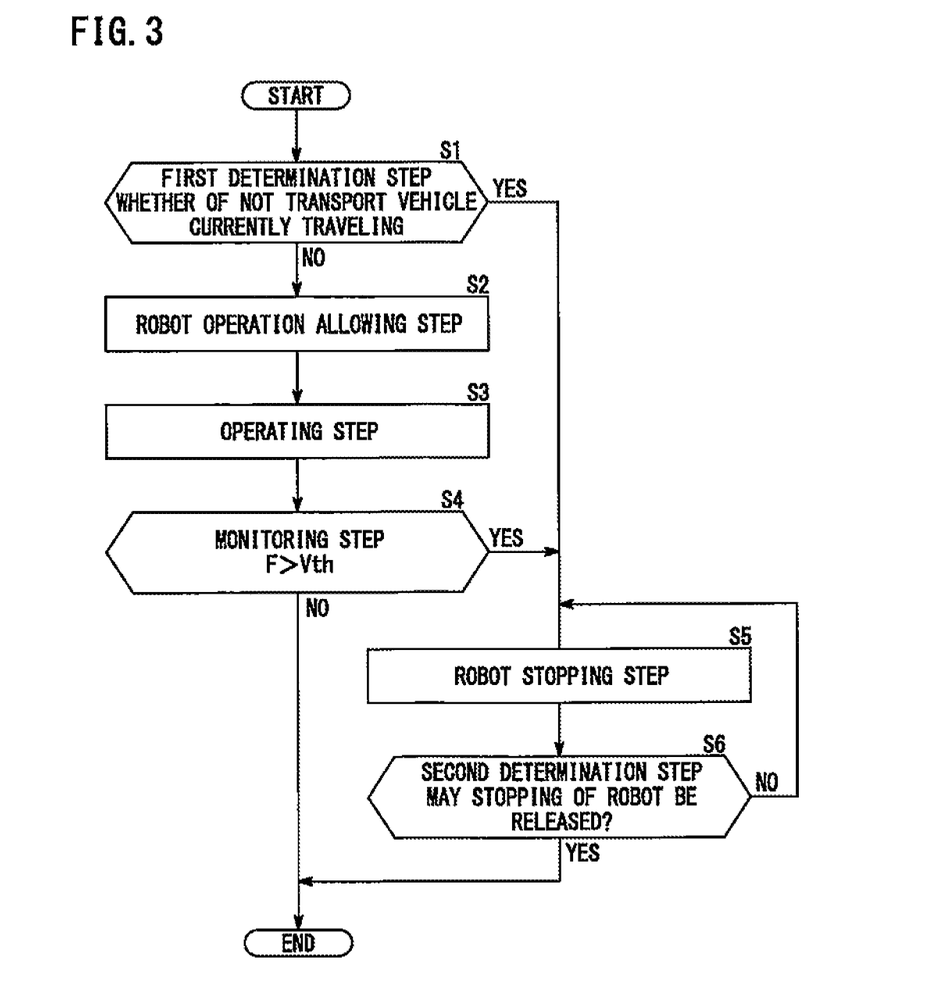
FIG. 3 is a flowchart showing an example of a robot control method according to the first embodiment.

FIG. 3 is a flowchart showing an example of a control method for the robot 12 according to the first embodiment.

Hereinafter, a description will be given concerning the "control method for the robot 12" (hereinafter, simply referred to as a control method) that can be executed by the control device 14 according to the present embodiment. In such a control method, first, a determination is made as to whether or not the transport vehicle 16 is currently traveling (step S1: first determination step). This step can be performed by the determination unit 28.

In the case that the transport vehicle 16 is not currently traveling (NO), the robot 12 can be operated (step S2: robot operation allowing step). The robot operation allowing step includes the following two steps. More specifically, the robot operation allowing step includes the operation of the robot 12 that is based on the control program 22 (step S3: operating step), and monitoring as to whether or not the external force F applied to the robot 12 lies within the threshold Vth (whether or not there is an abnormality) (step S4: monitoring step). The operating step can be performed by the control unit 30 executing the control program 22. Further, the monitoring step can be performed by the monitoring unit 32 monitoring the external force F detected by the sensors 20.

On the other hand, in the case that the transport vehicle 16 is currently traveling (YES), the robot 12 is made to stop (step S5: robot stopping step). This step can be performed by the control unit 30. At the time that the robot 12 is made to stop, as described above, the power supply to the robot 12 is preferably cut off.

The robot stopping step is also executed in the case that an abnormality is detected in the monitoring step. Consequently, even if an abnormality occurs during operation of the robot 12, such an operation is promptly interrupted.

After the robot stopping step has been initiated, a determination is made as to whether or not to terminate the robot stopping step (step S6: second determination step). In this step, a determination is made as to whether or not to terminate the robot stopping step, depending on whether or not a predetermined condition has been satisfied. In this instance, although the predetermined condition is a condition that can be appropriately determined, such a condition, for example, may be that a predetermined time period has elapsed from initiation of the robot stopping step, or alternatively, that an operator has provided an instruction to release stopping of the robot.

In the foregoing manner, according to the present embodiment, the robot 12 is permitted to be operated if the transport vehicle 16 is not currently traveling, however, the robot 12 is not allowed to be operated if the transport vehicle 16 is currently traveling. Further, even if the external force F is applied to the robot 12 when the robot 12 is not being operated, in other words, when the transport vehicle 16 is currently traveling, the transport vehicle 16 does not stop traveling.

Therefore, according to the present embodiment, concerning the collaborative operation unit 10 which is equipped with the robot 12, and the transport vehicle 16 on which the robot 12 is mounted, the transport vehicle 16 is inhibited from being stopped when passing through a difference in level.

Second Embodiment

Hereinafter, a description will be given concerning a second embodiment. It should be noted that descriptions of the same elements as those described in the first embodiment may be appropriately omitted.

Figure 4:
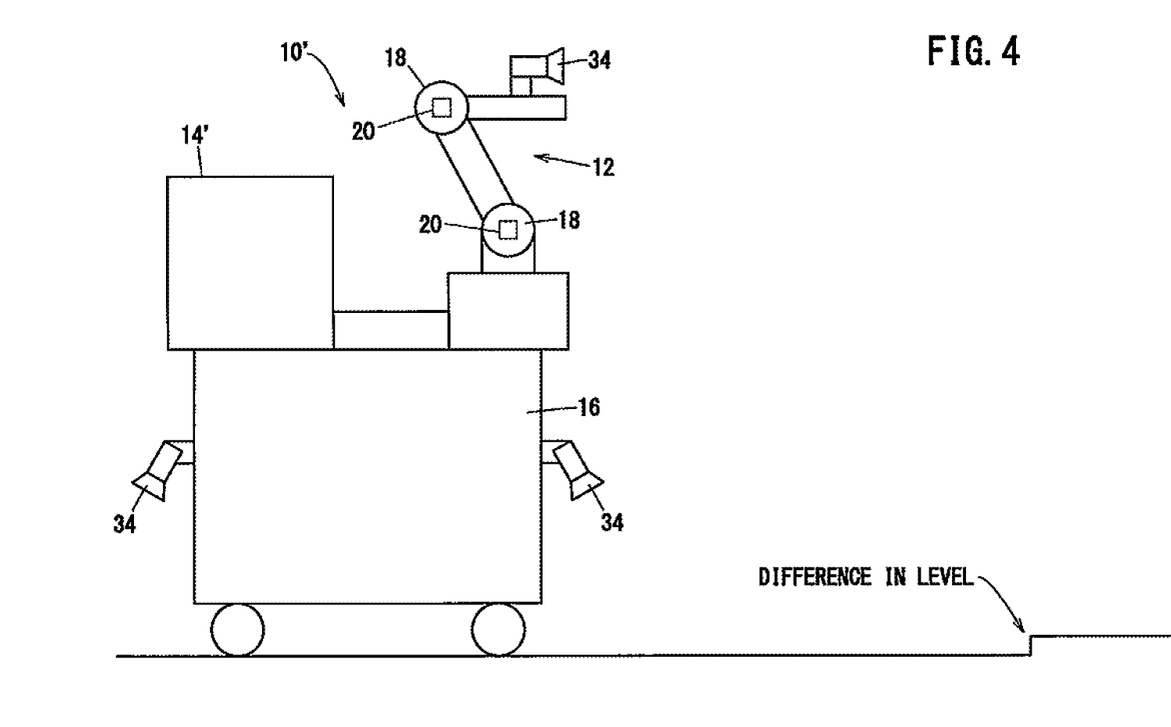
FIG. 4 is an overall configuration diagram of a collaborative operation unit according to a second embodiment.

FIG. 4 is an overall configuration diagram of a collaborative operation unit 10' according to the second embodiment.

The collaborative operation unit 10' according to the present embodiment is equipped with the robot 12 and the transport vehicle 16, which are the same as those of the first embodiment. More specifically, the robot 12 includes a plurality of joints which are operated by the motors 18, and the sensors 20 for detecting the external force F are provided in the motors 18. According to the present embodiment, the sensors 20 are also referred to as first sensors 20. The transport vehicle 16 is an AGV that travels along the travel path in a state with the robot 12 being mounted thereon.

Further, the collaborative operation unit 10' is further equipped with a control device (the control device for the robot 12) 14' of the second embodiment, and second sensors 34. The control device 14' of the present embodiment serves as a device for controlling the robot 12, and is mounted on the transport vehicle 16. The second sensors 34 are sensors for detecting the surrounding terrain, and for example, are vision sensors.

The second sensors 34 are not limited to being vision sensors, insofar as they serve to detect the surrounding terrain, and for example, may be ultrasonic sensors. The number and arrangement of the second sensors 34 are not limited to the configuration shown in FIG. 4, insofar as, at least, the terrain in the forward moving direction of the transport vehicle 16 is capable of being detected.

Figure 5:
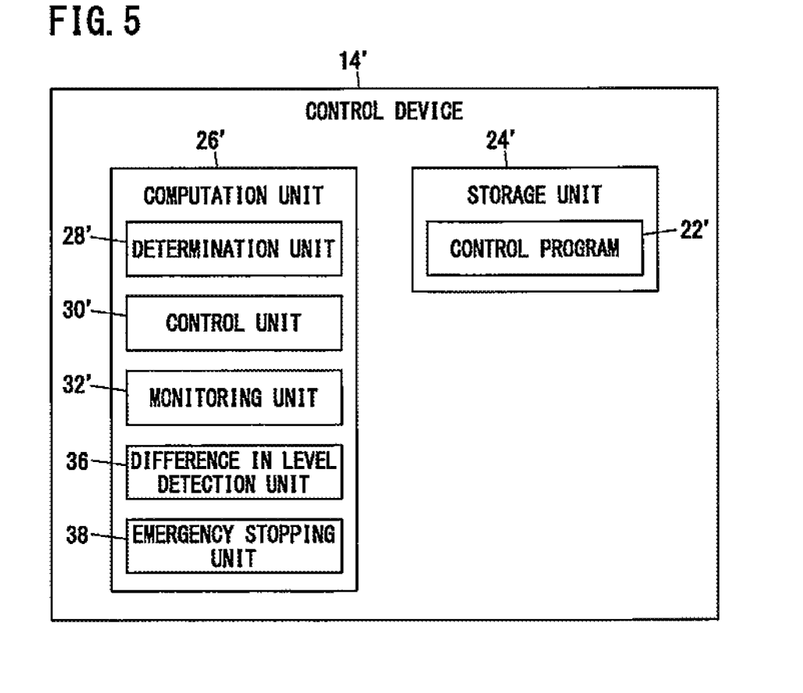
FIG. 5 is a functional configuration diagram of a robot control device according to the second embodiment.

FIG. 5 is a functional configuration diagram of the control device 14' for the robot 12 according to the second embodiment.

The control device 14' is equipped with a computation unit 26' and a storage unit 24'. The computation unit 26' and the storage unit 24' may have the same configuration as the computation unit 26 and the storage unit 24 of the first embodiment in terms of the hardware configuration thereof. The storage unit 24', in addition to storing a control program 22' for realizing the control of the present embodiment, appropriately stores information necessary for controlling the robot 12. The information necessary for controlling the robot 12, for example, is topographical information, as will be described later.

The computation unit 26' is equipped with a control unit 30', a difference in level detection unit 36, a monitoring unit 32', a determination unit 28', and an emergency stopping unit 38. Each of these units is realized by the computation unit 26' executing the control program 22' in cooperation with the storage unit 24'. Hereinafter, descriptions will be given sequentially of these respective units.

The control unit 30' operates the robot 12 by controlling driving of the motors 18 based on the control program 22'. Consequently, the robot 12 operates so as to perform operations in collaboration with a person.

Further, although a description thereof will be given later, the control unit 30' may receive a request from the emergency stopping unit 38 to stop operation of the robot 12. When the request is made from the emergency stopping unit 38 to stop operation of the robot 12, the control unit 30' promptly causes the robot 12 to be stopped (fixes the posture thereof) by stopping driving of the motors 18.

The difference in level detection unit 36 detects a difference in level (i.e., a step) on the travel path of the transport vehicle 16. The difference in level detection unit 36 of the present embodiment, based on the topographical information, detects such a difference in level before the traveling transport vehicle 16 arrives at the difference in level. The topographical information is information that is indicative of at least the position of the difference in level on the travel path of the transport vehicle 16.

The topographical information can be sequentially acquired accompanying traveling of the transport vehicle 16, by the second sensors 34 detecting the terrain around the periphery of the collaborative operation unit 10'. Such a technique is also commonly referred to as SLAM (Simultaneous Localization and Mapping).

Further, the topographical information may be acquired, prior to operation of the collaborative operation unit 10', by investigating in advance where differences in level exist on the floor surface inside the factory. In this case, the second sensors 34 can be omitted from the configuration of the collaborative operation unit 10'.

In the case that the external force F is applied to the robot 12, the determination unit 28' determines whether or not the external force F is applied while the transport vehicle 16 passes through the difference in level. Such a determination can be made by comparing the position of the difference in level detected by the difference in level detection unit 36, with the position of the collaborative operation unit 10' at the time that the external force F is applied. The position of the collaborative operation unit 10' can be acquired, for example, by GPS. The determination unit 28' may also estimate the position of the collaborative operation unit 10' from the results of mapping performed by SLAM.

For example, when the position of the collaborative operation unit 10' at the time that the external force F is applied to the robot 12 coincides with the position of the difference in level, the determination unit 28' determines the external force F applied to the robot 12 to be a force that was applied while the transport vehicle 16 passes through the difference in level. Alternatively, when the position of the collaborative operation unit 10' at the time that the external force F is applied to the robot 12 lies within a predetermined range centered about the difference in level, the determination unit 28' determines the external force F applied to the robot 12 to be a force that was applied while the transport vehicle 16 passes through the difference in level.

In the case that the external force F applied to the robot 12 is not applied while the transport vehicle 16 passes through the difference in level, the monitoring unit 32' detects, based on the external force F, that an abnormality is occurring in the robot 12 during operation thereof. Detection of the abnormality by the monitoring unit 32', in the same manner as in the monitoring unit 32 according to the first embodiment, is performed on the basis of whether or not the external force F lies within the predetermined threshold Vth.

When such an abnormality is detected, the monitoring unit 32' issues a notification to that effect to the emergency stopping unit 38. The emergency stopping unit 38 makes a request to the control unit 30' to stop the robot 12, in the case that the abnormality is detected based on an external force F that is not applied to the robot 12 while the transport vehicle 16 passes through the difference in level. Further, the emergency stopping unit 38 makes a request to the transport vehicle 16 to stop traveling.

When the request is made from the emergency stopping unit 38 to stop the robot 12, the control unit 30' promptly causes the robot 12 to be stopped (fixes the posture thereof) in response to such a request. Further, when a request is made from the emergency stopping unit 38 to stop traveling, the transport vehicle 16 is immediately stopped at that location.

Moreover, in the case that the external force F is applied to the robot 12 while the transport vehicle 16 passes through the difference in level, the monitoring unit 32' does not detect an abnormality in the first place. Accordingly, in such a case, the emergency stopping unit 38 does not make a request to the control unit 30' and the transport vehicle 16 to stop operation of the robot 12 and to stop traveling, respectively.

Figure 6:
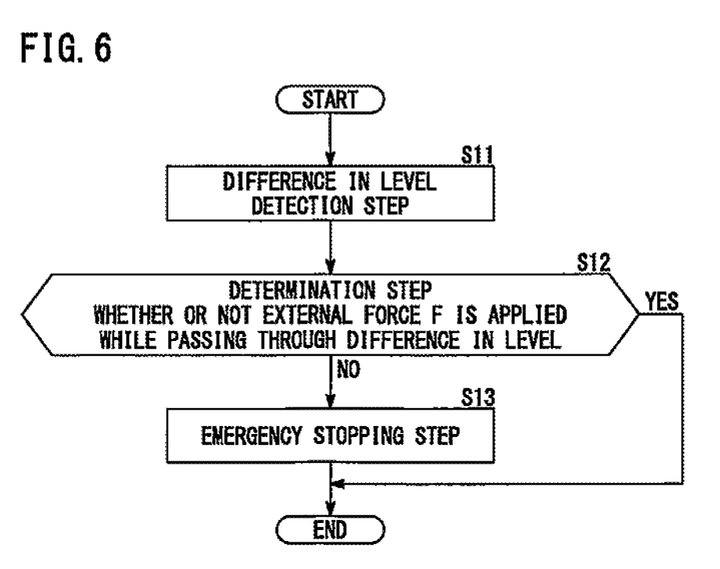
FIG. 6 is a flowchart showing an example of a robot control method according to the second embodiment.

FIG. 6 is a flowchart showing an example of a control method for the robot 12 according to the second embodiment.

Hereinafter, a description will be given concerning the control method for the robot 12 according to the present embodiment. Moreover, unless otherwise specified, the transport vehicle 16 will be described as traveling along a travel path.

First, the difference in level on the travel path of the transport vehicle 16 is detected (step S11: difference in level detection step). The difference in level detection step is performed by the difference in level detection unit 36 based on the topographical information.

Next, in the case that the external force F is applied to the robot 12, a determination is made as to whether or not the external force F is applied while the transport vehicle 16 passes through the difference in level (step S12: determination step). Such a determination is made by the determination unit 28'.

The determination can be made by comparing the position of the difference in level detected from the topographical information, and the current position of the collaborative operation unit 10'. If the external force F is applied at the time that the collaborative operation unit 10' is passing in the vicinity of the difference in level, it can be determined that the external force F is applied while the transport vehicle 16 passes through the difference in level.

In the case that the external force F applied to the robot 12 is not applied while the transport vehicle 16 passes through the difference in level (determination result: NO), a request is made to stop the robot 12, and to stop the transport vehicle 16 (step S13: emergency stopping step). The emergency stopping step is carried out by the emergency stopping unit 38 making requests, respectively, to the control unit 30' and the transport vehicle 16, on the basis of the result of the determination made by the emergency stopping unit 38 in the determination step.

In the case that the external force F is applied while the transport vehicle 16 passes through the difference in level (determination result: YES), the transport vehicle 16 is not requested to stop (END). Accordingly, even if an external force F is applied to the robot 12 while the transport vehicle 16 passes through the difference in level, the transport vehicle 16 continues to travel without interruption.

In the foregoing manner, in accordance with the control device 14' and the control method for the robot 12 according to the present embodiment, concerning the collaborative operation unit 10' which is equipped with the robot 12, and the transport vehicle 16 on which the robot 12 is mounted, the transport vehicle 16 is inhibited from being stopped when passing through a difference in level. Further, according to the present embodiment, traveling of the transport vehicle 16 and operation of the robot 12 can be carried out in parallel.

Third Embodiment

Figure 7:
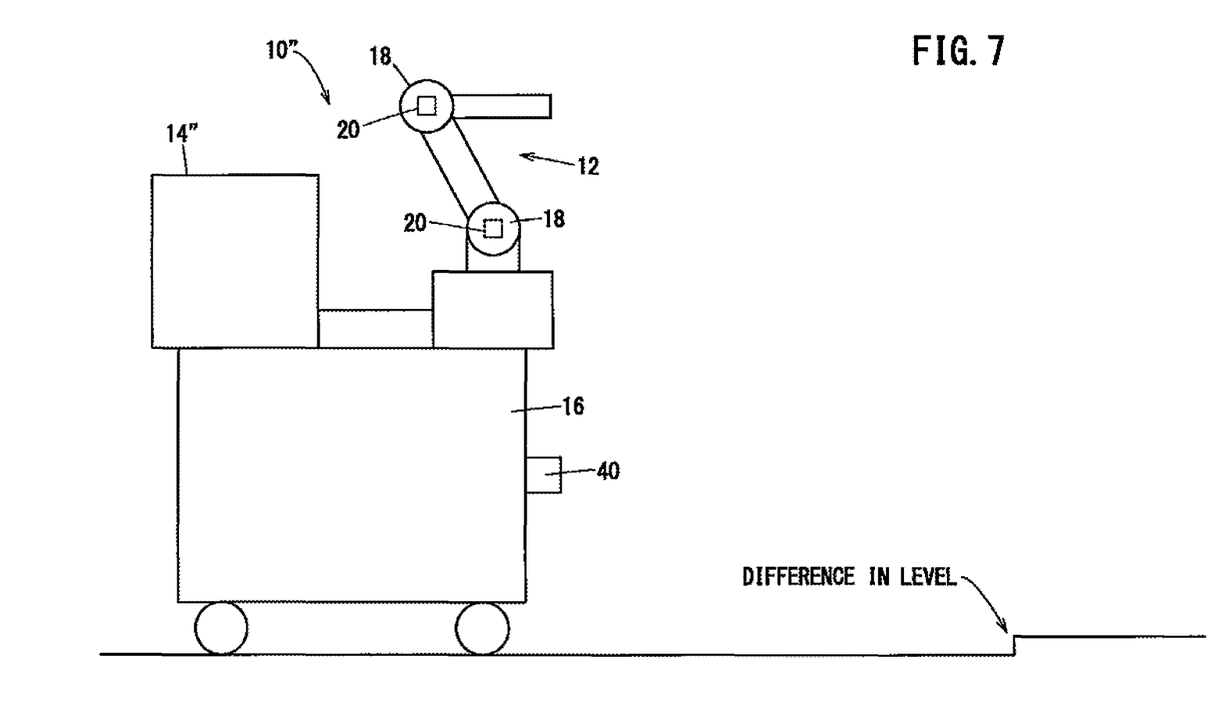
FIG. 7 is an overall configuration diagram of a collaborative operation unit according to a third embodiment.

Hereinafter, a description will be given concerning a third embodiment. The collaborative operation unit 10" according to the third embodiment differs from the collaborative operation unit in the second embodiment, in that a difference in level is detected after the transport vehicle 16 has arrived at the difference in level. Hereinafter, a description will be given concerning the configuration of the collaborative operation unit 10". It should be noted that descriptions of the same elements as those described in the first embodiment and the second embodiment may be appropriately omitted.

FIG. 7 is an overall configuration diagram of the collaborative operation unit 10" according to the third embodiment.

The collaborative operation unit 10" is equipped with the robot 12 including the motors 18, the first sensors 20 provided on the motors 18, the transport vehicle 16, a third sensor 40, and a control device 14". Among these elements, the robot 12, the transport vehicle 16, the motors 18, and the first sensors 20 have already been described in connection with the other embodiments, and therefore, description of such features will be omitted herein.

The third sensor 40 serves to detect an acceleration that is based on an external force F' applied to the transport vehicle 16. When the external force F' is applied to the transport vehicle 16, the third sensor 40 outputs to the control device 14" a detection signal in accordance with the acceleration that is based on the external force F'.

Figure 8:
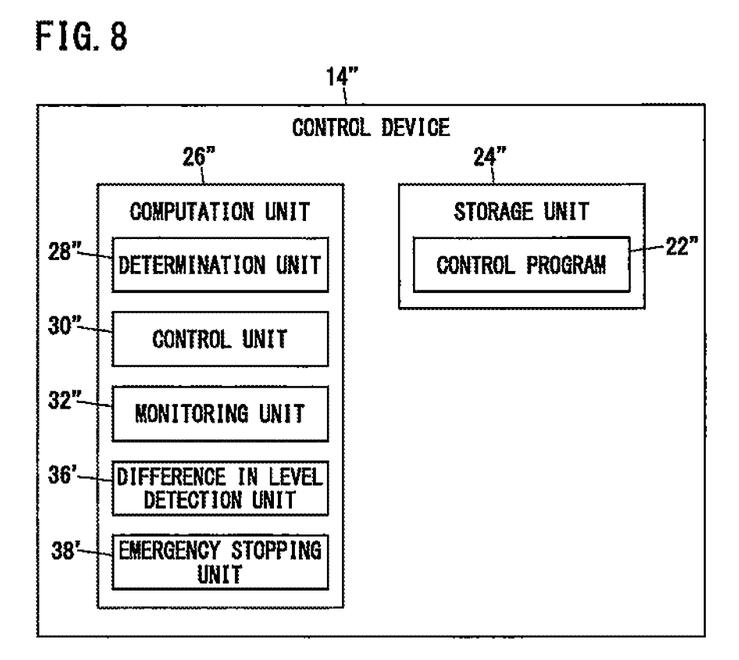
FIG. 8 is a functional configuration diagram of a robot control device according to the third embodiment.

FIG. 8 is a functional configuration diagram of the control device 14" for the robot 12 according to the third embodiment.

The control device 14" serves to control the robot 12 in the present embodiment. The control device 14" is equipped with a computation unit 26" and a storage unit 24". The computation unit 26" and the storage unit 24" may have the same configuration as the computation unit 26 and the storage unit 24 in terms of the hardware configuration thereof. A control program 22" is stored in the storage unit 24". The computation unit 26" realizes the control method described below by executing the control program 22".

The computation unit 26" is equipped with a control unit 30", a monitoring unit 32", a difference in level detection unit 36', a determination unit 28", and the emergency stopping unit 38'. Each of these units is realized by the computation unit 26" executing the control program 22" in cooperation with the storage unit 24".

Among the above-described units, the control unit 30" causes the robot 12 to perform operations based on the control program 22". Further, at the time that the control unit 30" causes the robot 12 to perform such operations, the monitoring unit 32" monitors the external force F detected by the first sensors 20, to detect any abnormal external force F applied to the robot 12 during operation thereof.

The difference in level detection unit 36' calculates the acceleration based on the abnormal external force F detected by the monitoring unit 32". Consequently, the acceleration based on the external force F applied to the robot 12 is obtained. Further, the difference in level detection unit 36' calculates a difference between the acceleration based on the external force F, and the acceleration based on the external force F' input from the third sensor 40. It is preferable that both of the accelerations be decomposed into components in respective three-dimensionally directed axial directions and the above-described difference be calculated for each of the respective directional components.

In addition, if the calculated difference lies within a predetermined range, the difference in level detection unit 36' determines (calculates the difference in level) that a difference in level exists at the location where the transport vehicle 16 has passed through. In this manner, the difference in level detection unit 36' of the present embodiment serves to detect a difference in level after the transport vehicle 16 has arrived at the difference in level. Moreover, in the case that the difference in acceleration is calculated for each of a plurality of directional components, the difference in level detection unit 36' determines whether or not the differences in all of such directions lie within the above-described range.

In the case that an external force F is applied to the robot 12, the determination unit 28" determines whether or not the external force F is applied while the transport vehicle 16 passes through the difference in level, by determining whether or not the difference in level detection unit 36' has detected the difference in level. More specifically, the determination unit 28" determines whether or not the monitoring unit 32" has detected an abnormal external force F applied to the robot 12, and additionally, determines whether or not the difference in level detection unit 36' has detected the difference in level based on the external force F. In spite of the abnormal external force F having been detected, in the case that the difference in level detection unit 36' does not detect the difference in level based on the external force F, the determination unit 28" invokes operation of the emergency stopping unit 38'.

When invoked by the determination unit 28", the emergency stopping unit 38' makes a request to the control unit 30" to stop the robot 12, and further, makes a request to the transport vehicle 16 to stop traveling.

The description given above is an outline of the collaborative operation unit 10" according to the present embodiment. Subsequently, a control method for the robot 12 that is capable of being executed by the control device 14" according to the present embodiment will be described.

Figure 9:
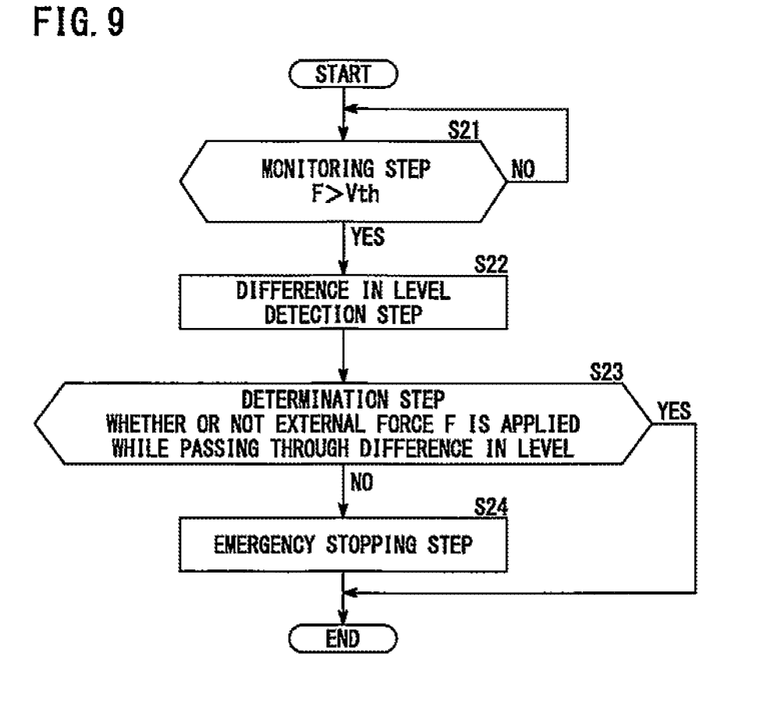
FIG. 9 is a flowchart showing an example of a robot control method according to the third embodiment.

FIG. 9 is a flowchart showing an example of a control method for the robot 12 according to the third embodiment. Hereinafter, as in the second embodiment, unless otherwise specified, the transport vehicle 16 will be described as traveling along a travel path.

In the control method according to the present embodiment, initially, the monitoring unit 32" monitors the external force F applied to the robot 12, to detect whether an abnormality occurs in the robot 12 during operation thereof (step S21: monitoring step). The monitoring unit 32" determines that an abnormality has occurred when an external force F in excess of the threshold Vth is applied to the robot 12. Further, during this period, the robot 12 can perform operations in collaboration with a person. Control of the operations of the operating robot 12 is carried out by the control unit 30" on the basis of the control program 22".

When an abnormality is detected in the monitoring step (YES), the difference in level detection unit 36' detects the difference in level based on the external force F applied to the robot 12 (step S22: difference in level detection step). As discussed previously, the difference in level detection unit 36' is capable of detecting the difference in level, on the basis of whether or not the difference between the acceleration based on the external force F applied to the robot 12, and the acceleration based on the external force F' applied to the transport vehicle 16 lies within a predetermined range.

Next, the determination unit 28" receives the result of the difference in level detection step, and determines whether or not the external force F is applied while the transport vehicle 16 passes through the difference in level (S23: determination step). In such a determination, in the case that the difference in level detection unit 36' detects the difference in level based on an abnormal external force F, a determination is made that the external force F is applied while the transport vehicle 16 passes through the difference in level.

In the case it is determined that the external force F detected in the monitoring step is applied while the transport vehicle 16 passes through the difference in level (YES), the control method of FIG. 9 is temporarily terminated (END). In this case, if the transport vehicle 16 is currently traveling, the transport vehicle 16 continues to travel without being stopped.

On the other hand, in the case that the external force F is not a force that is applied while the transport vehicle 16 passes through the difference in level (NO), operation of the emergency stopping unit 38' is invoked (step S24: emergency stopping step). In the emergency stopping step, the robot 12 is made to stop if the robot 12 is currently under operation, and the transport vehicle 16 is made to stop if the transport vehicle 16 is currently traveling.

In accordance with the control device 14" and the control method for the robot 12 according to the present embodiment, even in the case that an abnormal external force F is applied to the robot 12, operation of the emergency stopping unit 38' is not invoked if the difference in level is detected based on this external force F. Accordingly, concerning the collaborative operation unit 10" which is equipped with the robot 12, and the transport vehicle 16 on which the robot 12 is mounted, the transport vehicle 16 is inhibited from being stopped when passing through a difference in level.

Modifications

Although embodiments have been described above as examples of the present invention, it goes without saying that various modifications or improvements can be made to the above-described embodiments. It is clear from the scope of the claims that modes to which such modifications or improvements have been added can be included within the technical scope of the present invention.

Inventions Obtained from the Embodiments

Inventions that can be grasped from the above-described embodiments and the modifications thereof will be described below.

First Invention

The control device (14) for the robot (12) mounted on the transport vehicle (16) causes the robot (12) to be stopped on the basis of the external force (F) applied to the robot (12), and is equipped with the determination unit (28) that determines whether or not the transport vehicle (16) is currently traveling, and the control unit (30) that causes the robot (12) to be stopped in the case that the transport vehicle (16) is currently traveling, and enables the robot (12) to be operated in the case that the transport vehicle (16) is not currently traveling.

In accordance with such features, the control device (14) for the robot (12) is provided, by which the transport vehicle (16) is inhibited from being stopped when passing through a difference in level.

The control unit (30) may cut off the power supply to the robot (12) in the case that the transport vehicle (16) is currently traveling, and may enable the power supply to the robot (12) in the case that the transport vehicle (16) is currently stopped. Consequently, the robot (12) can be stopped more reliably.

Second Invention

The collaborative operation unit (10) is equipped with the control device (14) for the robot (12) according to the first invention, the robot (12) which is controlled by the control device (14), and the transport vehicle (16) on which the control device (14) and the robot (12) are mounted.

In accordance with such features, the collaborative operation unit (10) is provided, in which the transport vehicle (16) is inhibited from being stopped when passing through a difference in level.

Third Invention

The control method for controlling the robot (12) which is mounted on the transport vehicle (16) comprises the determination step of determining whether or not the transport vehicle (16) is currently traveling, the robot operation allowing step of, in the case that the transport vehicle (16) is not currently traveling, detecting whether or not there is an abnormality based on the external force (F) applied to the robot (12), while enabling the robot (12) to be operated, and the robot stopping step of causing the robot (12) to be stopped in the case that the transport vehicle (16) is currently traveling, or in the case that the abnormality is detected.

In accordance with such features, the method for controlling the robot (12) is provided, in which the transport vehicle (16) is inhibited from being stopped when passing through a difference in level.

In the robot stopping step, the robot (12) may be stopped by cutting off the power supply to the robot (12). Consequently, the robot (12) can be stopped more reliably.

Fourth Invention

The control device (14', 14") for the robot (12), which requires that the transport vehicle (16) be stopped on the basis of the external force (F) applied to the robot (12) that is mounted on the transport vehicle (16), is equipped with the difference in level detection unit (36, 36') that detects the difference in level on the travel path of the transport vehicle (16), the determination unit (28', 28") that determines, in the case that the external force (F) is applied to the robot (12), whether or not the external force (F) is applied while the transport vehicle (16) passes through the difference in level, and the emergency stopping unit (38, 38') which does not make a request that the transport vehicle (16) be stopped in the case that the external force (F) is applied while the transport vehicle (16) passes through the difference in level.

In accordance with such features, the control device (14', 14") for the robot (12) is provided, by which the transport vehicle (16) is inhibited from being stopped when passing through a difference in level.

There may be further provided the storage unit (24', 24") which stores the topographical information indicating the position of the difference in level on the travel path, and the difference in level detection unit (36, 36') may detect the difference in level based on the topographical information. In accordance with this feature, the difference in level is detected based on the topographical information.

The difference in level detection unit (36') may detect the difference in level based on whether or not a difference between the external force (F) applied to the robot (12) and the external force (F') applied to the transport vehicle (16) lies within a predetermined range. Consequently, when the external force (F) is applied to the robot (12), the difference in level is detected on the basis of the external force (F).

Fifth Invention

The control method for controlling the robot (12) which is mounted on the transport vehicle (16) comprises the difference in level detection step of detecting the difference in level on the travel path of the transport vehicle (16), the determination step of determining, in the case that the external force (F) is applied to the robot (12), whether or not the external force (F) is applied while the transport vehicle (16) passes through the difference in level, and the emergency stopping step of making a request for emergency stopping of the transport vehicle (16) in the case that the external force (F) is not applied while the transport vehicle (16) passes through the difference in level, and not making a request for emergency stopping of the transport vehicle (16) in the case that the external force (F) is applied while the transport vehicle (16) passes through the difference in level.

In accordance with such features, the method for controlling the robot (12) is provided, in which the transport vehicle (16) is inhibited from being stopped when passing through a difference in level.

In the difference in level detection step, the determination may be made based on the topographical information indicative of the position of the difference in level on the travel path. In accordance with this feature, the difference in level is detected based on the topographical information.

In the difference in level detection step, the difference in level may be detected based on whether or not a difference between the external force (F) applied to the robot (12) and the external force (F') applied to the transport vehicle (16) lies within a predetermined range. Consequently, when the external force (F) is applied to the robot (12), the difference in level is detected on the basis of the external force (F).

What is claimed is:

1. A robot control device configured to cause a robot mounted on a transport vehicle to be stopped on a basis of an external force applied to the robot, the robot control device comprising:
   one or more processors that execute computer-executable instructions stored in a memory,
   wherein the one or more processors execute the computer-executable instructions to cause the robot control device to:
      determine whether or not the transport vehicle is currently traveling, wherein the one or more processors are configured to determine, in a case that the external force is applied to the robot, whether or not the external force is applied while the transport vehicle passes through a difference in level on a travel path of the transport vehicle;
      cause the robot to be stopped in a case that the transport vehicle is currently traveling, and enable the robot to be operated in a case that the transport vehicle is not currently traveling;
      cause the transport vehicle to pass through the difference in level without stopping the transport vehicle in a case that the transport vehicle is traveling, and the external force is applied to the robot while the transport vehicle passes through the difference in level; and
      cause the transport vehicle to stop in a case that the transport vehicle is traveling, and the external force is applied to the robot while the transport vehicle does not pass through the difference in level.

2. The robot control device according to claim 1, wherein the one or more processors cut off a power supply to the robot in the case that the transport vehicle is currently traveling, and to enable the power supply to the robot in a case that the transport vehicle is currently stopped.

3. A collaborative operation unit comprising:
   the robot control device according to claim 1;
   a robot controlled by the control device; and
   a transport vehicle on which the control device and the robot are mounted.

4. A robot control method for controlling a robot mounted on a transport vehicle, the robot control method comprising:
   a determination step of determining whether or not the transport vehicle is currently traveling, the determination step including determining, in a case that an external force is applied to the robot, whether or not the external force is applied while the transport vehicle passes through a difference in level on a travel path of the transport vehicle;
   a robot operation allowing step of, in a case that the transport vehicle is not currently traveling, detecting whether or not there is an abnormality based on the external force applied to the robot, while enabling the robot to be operated;
   a robot stopping step of causing the robot to be stopped in a case that the transport vehicle is currently traveling, or in a case that the abnormality is detected;
   a transport vehicle traveling step of causing the transport vehicle to pass through the difference in level without stopping the transport vehicle in a case that the transport vehicle is traveling, and the external force is applied to the robot while the transport vehicle passes through the difference in level; and
   a transport vehicle stopping step of causing the transport vehicle to stop in a case that the transport vehicle is traveling, and the external force is applied to the robot while the transport vehicle does not pass through the difference in level.

5. The robot control method according to claim 4, wherein, in the robot stopping step, the robot is stopped by cutting off a power supply to the robot.

6. The robot control device of claim 1, wherein the one or more processors detect the differences in the level on the travel path of the transport vehicle.

* * * * *